United States Patent [19]
Krambrock

[11] 3,768,867
[45] Oct. 30, 1973

[54] METHOD OF AND AN APPARATUS FOR PNEUMATICALLY CONVEYING FEEDSTOCK

[75] Inventor: Wolfang Krambrock, Leverkusen, Germany

[73] Assignee: Farbenfabriken Bayer Aktiengesellschaft, Leverkusen, Germany

[22] Filed: Feb. 26, 1970

[21] Appl. No.: 14,476

[30] Foreign Application Priority Data
Mar. 13, 1969 Germany............... P 19 12 733.4

[52] U.S. Cl.................................. 302/53, 302/55
[51] Int. Cl............................................ B65g 53/36
[58] Field of Search ............... 302/55, 51, 57, 35, 302/42

[56] References Cited
UNITED STATES PATENTS

| | | | |
|---|---|---|---|
| 2,771,323 | 11/1956 | Taylor | 302/57 |
| 3,437,384 | 4/1969 | Bozich | 302/53 |
| 3,385,635 | 5/1968 | Carlsen | 302/53 |

Primary Examiner—Evon C. Blunk
Assistant Examiner—Johnny D. Cherry
Attorney—Burgess, Dinklage & Sprung

[57] ABSTRACT

Feedstock is conveyed from a supply vessel under constant delivery pressure and in constant quantities while the feedstock is fed through a closure member, wherein an adjustable loading pressure is allowed to act on the closure force of the closure member, the loading pressure being governed by the delivery pressure and is high in relation to the weight of the column of feedstock resting on the closure member.

10 Claims, 4 Drawing Figures

Patented Oct. 30, 1973

INVENTOR.
WOLFGANG KRAMBROCK
BY Burgess, Dinklage &
Sprung
Attorneys

Patented Oct. 30, 1973

INVENTOR.
Wolgang Krambrock
BY Burgess, Dinklage
+ Sprung
Attorneys

METHOD OF AND AN APPARATUS FOR PNEUMATICALLY CONVEYING FEEDSTOCK

This invention relates to a method and apparatus for pneumatically conveying feedstock in constant quantities under a constant delivery or conveying pressure by means of a supply vessel, the feedstock being fed to the delivery pipe through a closure member.

It is known that powdered or granular feedstocks can be conveyed through pipes by means of compressed air. The conveying pressure is subject to considerable fluctuations with consequent variation in the volume of feedstock being conveyed. In many cases, piles of feedstock accumulate locally in the delivery pipe so that a relatively long plug of feedstock occupying the entire cross-section of the pipe is formed. This automatically gives rise to a considerable increase in pressure in the supply vessel and in that section of the delivery pipe upstream of the plug. In general, the plug disintegrates when the pressure in the delivery vessel reaches a sufficiently high level and is conveyed along the pipe. The delivery air compressed in the delivery vessel then expands due to the sudden fall in pressure in the delivery pipe and forces an undesirably large quantity of feedstock into the delivery pipe so that complete blockage is frequently caused.

In order to guarantee safe delivery, the compressor for the compressed air and the supply vessel have to be dimensioned in such a way that a considerably higher pressure than that normally required for conveying the required quantity of feedstock can be made available.

An object of the invention is to provide a method and apparatus which obviate the disadvantages referred to above. Another object of the invention is to pass a constant volume of feedstock through the delivery pipe under a constant delivery pressure.

According to the invention, an adjustable load is allowed to act on the closing force of the closure member which is governed by the delivery pressure, the adjustable constant load being large in relation to the weight of the column of feedstock resting on the closure member. In this way, an automatic control system is provided for maintaining the required conditions.

The load is preferably generated pneumatically, hydraulically or mechanically.

In a preferred embodiment of the process according to the invention, the supply of feedstock to the delivery pipe is supported by a supply of delivery gas, regulated in dependence upon the delivery pressure, into the supply vessel by passing the closure member. In this way, bridges which would prevent the feedstock from continuing to flow cannot be formed.

The apparatus according to the invention for carrying out the method comprises a supply vessel followed by a collecting vessel with a closure member arranged between the collecting vessel and the supply vessel. The inventive aspect of this arrangement is that the closure member is suspended by levers from at least one elastic diaphragm fixed to the collecting vessel in such a way as to seal it off, and is connected to an adjustable loading system.

The elastic diaphragm preferably consists of a bellows whose lower end is fixed to the collecting vessel in such a way as to seal the vessel, whilst its upper end is closed by a disc from which the lever system is suspended.

Alternatively, the elastic diaphragm consists of a flat diaphragm from which the level system is suspended. Both when the diaphragm is in the form of a bellows and when it is in the form of a flat diaphragm, elastic sheet metals or even rubber or plastics may be used as its constitutent materials.

In a preferred embodiment of the invention, that side of the diaphragm remote from the collecting vessel is surrounded by a compressed air chamber which communicates with a pressure adjustable pneumatic or hydraulic system. In this embodiment, the diaphragm is acted upon, on the one hand by the delivery pressure prevailing inside the collecting vessel, and on the other hand by the fluid medium under the loading pressure.

To prevent the diaphragms from tearing due to the load acting upon them from outside in the event of an excessive fall in the delivery pressure inside the collecting vessel, it is proposed, according to another particular aspect of the invention, to connect the pneumatic or hydraulic system through a check valve with the inside of the collecting vessel. If the pressure in the collecting vessel falls below a predetermined value to which the check valve is adjusted, the check valve opens and air flows from the pneumatic loading system through the check valve into the inside of the collecting vessel. This prevents the diaphragms from being overstretched.

If the loading system operates hydraulically, it will be necessary to incorporate an intermediate unit which converts the hydraulically applied pressure into a pneumatic pressure. To protect the diaphragm in the event of excessive delivery pressure, i.e., in the other direction of extension, a perforated supporting plate extending over the cross-section of the compressed air chamber is preferably arranged on that side of the diaphragm remote from the collecting vessel. If there is a marked increase in the delivery pressure, the diaphragm applies itself to the supporting plate. The perforation of the supporting plate is kept very small so that the diaphragm cannot be pressed through the perforation holes.

In an equivalent embodiment of the apparatus according to the invention for applying the load, the lever system is connected to a mechanical loading system. The loading system preferably consists of a weighted lever or of a spring-loaded lever.

According to an advantageous aspect of the invention, a pneumatic loosening means known per se is arranged in the supply vessel, being functionally connected with the closure member, in such a way that in the event of the closure member opening to a certain extent a valve is opened in the pipe supplying air to the loosening means. In this way, the flow of feedstock is accelerated, the pressure in the collecting vessel rises, the closure member reduces the throughflow cross-section and simultaneously closes the valve in the compressed air line leading to the loosening means through the lever system.

In a preferred embodiment of the invention, the loosening means is arranged to be connected through a three-way valve to an air supply line from which a delivery or carrier air line leads to the collecting vessel. The three-way valve comprises a control plunger coupled with the closure member which, in any position, leaves open the connection between the air supply line and the delivery air line. In this way, a very simple solution to the problem in terms of design is provided by the three-way valve. The control plunger of the three-way valve, in conjunction with an adjustable spring, preferably forms part of the loading system. Although this represents a particularly favourable embodiment in terms of design, it can also be replaced by other obvious solutions.

Two embodiments of the process according to the invention and the associated apparatus are diagrammatically illustrated by way of example in the accompanying drawings, wherein.

Figure 1:
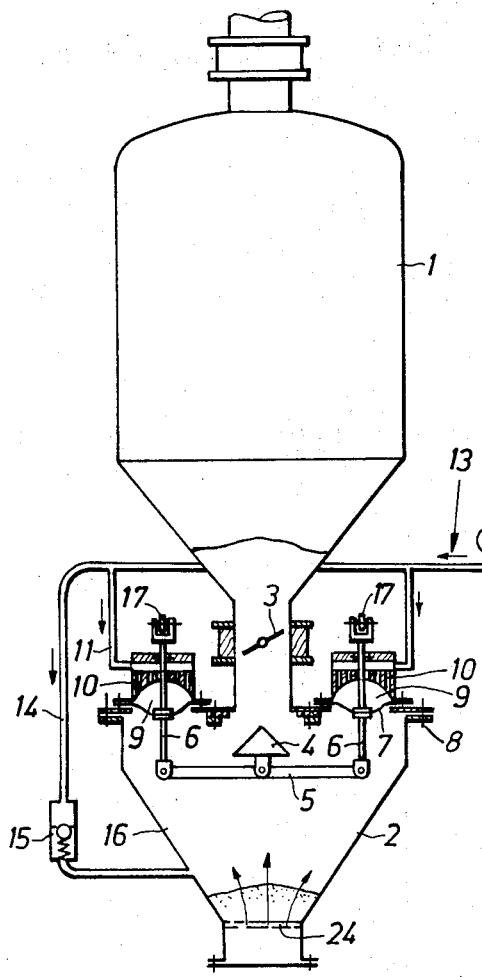
FIG. 1 is a schematic side view of an apparatus with a pneumatic loading system, partly in longitudinal section.
Figure 2:
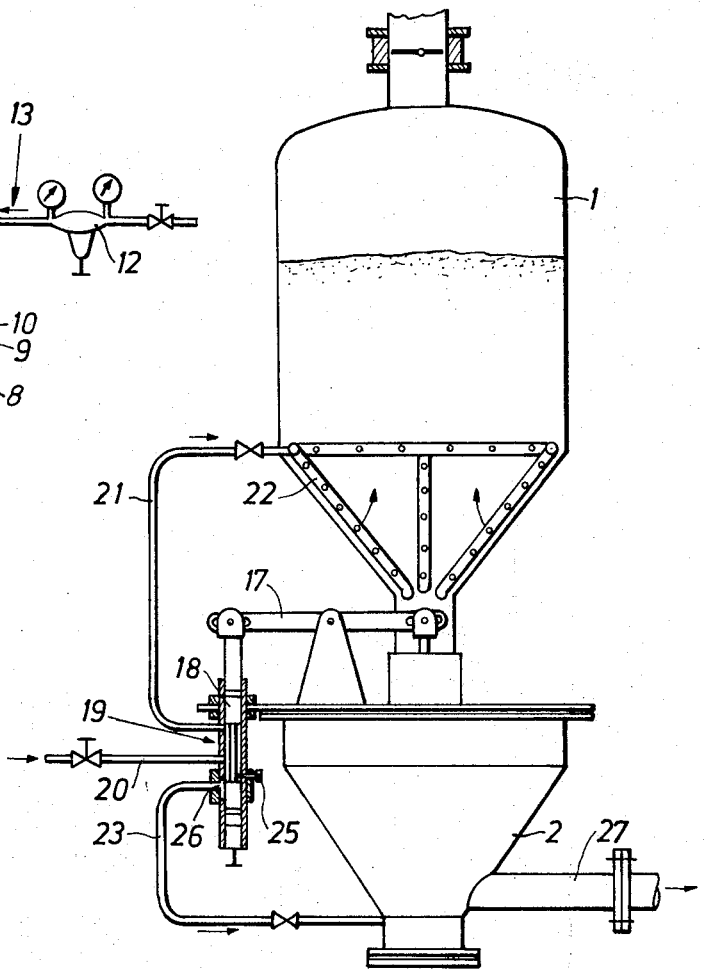
FIG. 2 is a view of right angles to that shown in FIG. 1.

As shown in FIGS. 1 and 2, a collecting vessel 2 is arranged beneath a supply vessel 1. The supply vessel 1 can be closed by means of a flap 3. A closure member 4 fixed centrally to a crossmember 5 is used for adjusting the volume of feedstock delivered into the collecting vessel 2. The ends of the crossmember 5 are engaged by vertical rods 6 suspended from flat diaphragms 7 which are attached to a cover 8 of the collecting vessel 2 in such a way as to seal it. Compressed air chambers 9 are arranged above the flat diaphragms 7 through which the rods 6 are guided in fluid-tight fashion. Perforated supporting plates 10 extending over the cross-sections of the compressed air chambers 9 prevent the flat diaphragms 7 from being over-extended or even torn in the event of excessive pressure in the collecting vessel 2. The compressed air chambers 9 communicate through lines 11 and an adjustable control valve 12 with a compressor (not shown). Working pressure is adjusted by means of the control valve 12 as a load acting on the closure member 4. This pneumatic system will be referred to in toto as the loading system 13. Leading from the pipe 11 there is a pipe 14 which leads by way of a check valve 15 to the inside 16 of the collecting vessel 2. The check valve 15 opens when the pressure in the collecting vessel falls below a predetermined safety level, thus preventing the flat diaphragms 7 from splitting under the loading pressure acting on the other side. The rods 6 are coupled through levers 17 to the control plunger 18 of a three-way valve 19. The three-way valve is connected to a compressed-air supply line 20 from which a pipe 21 leads to a loosening means 22 arranged on the conical base of the supply vessel 1. The pipe 21 is opened by means of the control plunger 18 when the closure member 4 reaches a certain closure position. The inflowing loosening air assists the flow of the feedstock from the supply vessel 1 into the collecting vessel 2. At the same time, the volume of carrier air delivered through the pipe 23 to the collecting vessel 2 beneath the porous plate 24 is regulated in dependence upon the position of the closure member.

A striker pin 25 limits the stroke of the control plunger 18 so that the connection between the compressed air supply line 20 and the carrier air line 23 always remains open. Accordingly, it is only the throughflow cross-section that is varied by means of the control plunger 18. In order to guarantee this with the control plunger adjusted to a suitable stroke, a longitudinal hole 26 arranged parallel to the control plunger 18 is provided at the branch of the delivery air line 23. The reference numeral 27 denotes the delivery line.

Figure 3:
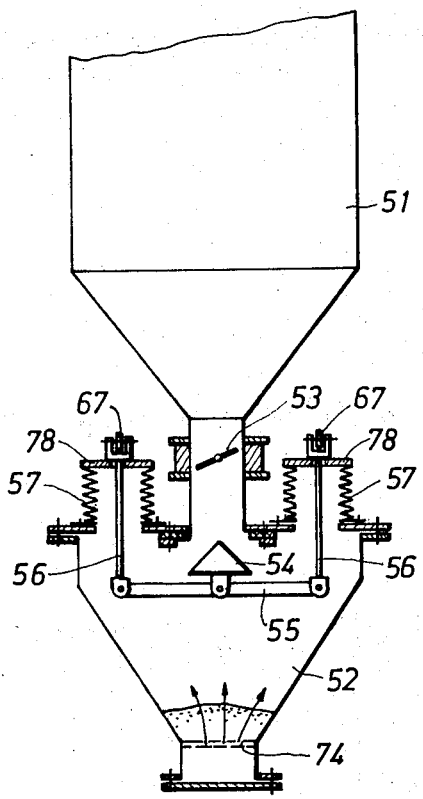
FIG. 3 illustrates an apparatus with a mechanical loading system, partly in longitudinal section.
Figure 4:
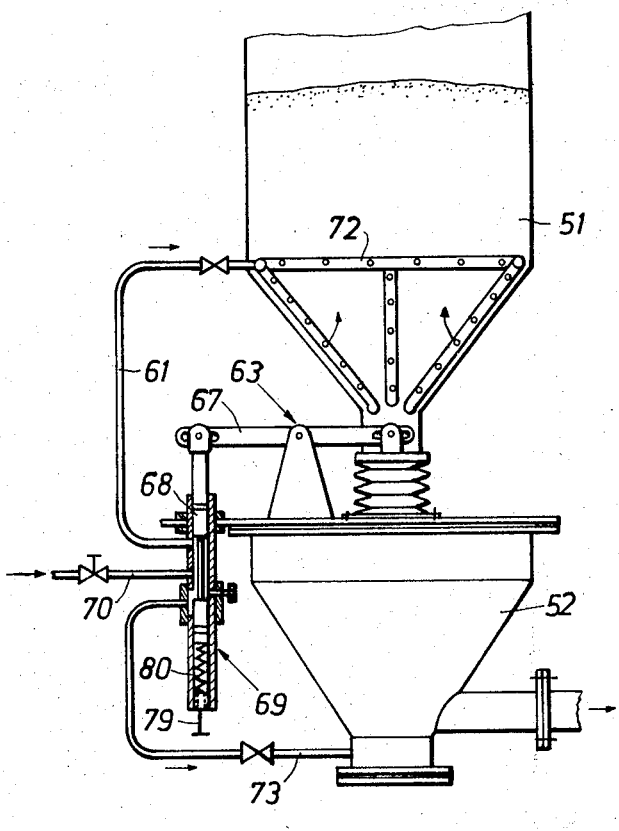
FIG. 4 is a view of the apparatus of FIG. 3 at right angles to that shown in FIG. 3.

As shown in FIGS. 3 and 4, a collecting vessel 52 is arranged beneath a supply vessel 51. The supply vessel 51 can be closed by means of a flap 53. The actual throughflow cross-section is adjusted by means of a closure member 54. It is mounted on a crossmember 55 whose ends are engaged by rods 56 suspended from discs or plates 78 which represent the seals of diaphragms in the form of bellows 57. Linked to the upper ends of the rods 56 there are levers 67 which are pivotally connected to the control plunger 68 of a three-way valve 69. The other end of the control plunger 68 is loaded by a spring 80 that can be adjusted by means of an adjusting screw 79. In this case, the loading system is represented by adjusting screw 79, the control plunger 68, the lever 67, rods 56 and cross-member 55 to the closure member 54. The line 61 branches off from the three-way valve 69 to a loosening means 72 arranged at the bottom of the supply vessel 51. The compressed air supply line to the three-way valve 69 is denoted by the reference 70. The carrier or delivery air line 73 opens into the collecting vessel 52 beneath the porous plate 74. The three-way valve 697 operates in the same way as in the embodiment illustrated in FIGS. 1 and 2.

I claim:

1. An apparatus for pneumatically conveying feedstock in constant quantities and under a constant delivery pressure, comprising a supply vessel followed by a collecting vessel with a closure member arranged between the collecting vessel and the supply vessel, wherein the closure member (4, 54) is suspended by means of rods (5, 6 or 55, 56) from at least one elastic diaphragm (7, 57) fixed to the collecting vessel (2, 52) in such a way as to seal it, and is connected to an adjustable loading system (13, 63), that side of the diaphragm (7) remote from the collecting vessel (2) being surrounded by a compressed air chamber (9) which is connected to a pressure-adjustable fluid (13).

2. An apparatus as claimed in claim 1, wherein the elastic diaphragm consists of a bellows (57) whose lower end is fixed to the collecting vessel (52) in such a way as to seal it, and whose upper end is closed by a disc (78) from which the rods (55, 56) are suspended.

3. An apparatus as claimed in claim 2, wherein the elastic diaphragm consists of a flat diaphragm (7) from which the rods (5, 6) are suspended.

4. An apparatus as claimed in claim 1, wherein the fluid (13) is connected through a check valve (15) to the inside of the collecting vessel (2).

5. An apparatus as claimed in claim 1, wherein a perforated supporting plate (10) extending over the cross-section of the compressed air chamber (9) is arranged on that side of the diaphragm (7) remote from the collecting vessel (2).

6. An apparatus as claimed in claim 1, wherein the rods (55, 56) are connected to a mechanical loading system (63).

7. An apparatus as claimed in claim 6, wherein the mechanical loading system (63) consists of a lever (67) loaded with a spring (80).

8. An apparatus as claimed in claim 1, wherein a pneumatic loosening means (22, 72) is arranged in the supply vessel (1, 51) and is functionally coupled with the closure member (4, 54).

9. An apparatus as claimed in claim 8, wherein the loosening means (22, 72) is arranged to be connected through a three-way valve (19, 69) to an air supply line (20, 70) from which a delivery air line (23, 73) leads to the collecting vessel (2, 52), the three-way valve (19, 69) comprising a control plunger (8, 68) coupled with the closure member (4, 54) which in any position leaves open the connection between the air supply line (20, 70) and the delivery air line (23, 73).

10. An apparatus as claimed in claim 8, wherein the control plunger (68) of the three-way valve (69) in conjunction with an adjustable spring (80) forms part of the loading system (63).

* * * * *